United States Patent
Kim et al.

(10) Patent No.: US 7,742,538 B2
(45) Date of Patent: Jun. 22, 2010

(54) METHOD FOR SELECTING OPTIMAL BEAM AND APPARATUS FOR RECEIVING DIGITAL BROADCASTING SIGNAL USING THE SAME

(75) Inventors: Ju-Yeun Kim, Daegu (KR); Young-Su Kim, Daejeon (KR); Jae-Hwui Bae, Daejeon (KR); Hyun Lee, Daejeon (KR); Jong-Soo Lim, Daejeon (KR); Soo-In Lee, Daejeon (KR)

(73) Assignee: Electronics and Telecommunications Research Institute, Daejon (KR)

(*) Notice: Subject to any disclaimer, the term of this patent is extended or adjusted under 35 U.S.C. 154(b) by 608 days.

(21) Appl. No.: 11/720,323

(22) PCT Filed: Nov. 25, 2005

(86) PCT No.: PCT/KR2005/003998

§ 371 (c)(1),
(2), (4) Date: May 25, 2007

(87) PCT Pub. No.: WO2006/057526

PCT Pub. Date: Jun. 1, 2006

(65) Prior Publication Data

US 2008/0205537 A1    Aug. 28, 2008

(30) Foreign Application Priority Data

Nov. 26, 2004    (KR) .................. 10-2004-0098223

(51) Int. Cl.
H04B 7/02 (2006.01)
(52) U.S. Cl. .................................................. 375/267
(58) Field of Classification Search ................ 375/267, 375/343
See application file for complete search history.

(56) References Cited

U.S. PATENT DOCUMENTS

| | | | | |
|---|---|---|---|---|
| 7,403,748 | B1* | 7/2008 | Keskitalo et al. | 455/101 |
| 2004/0157646 | A1* | 8/2004 | Raleigh et al. | 455/562.1 |
| 2004/0235421 | A1* | 11/2004 | Matsuoka et al. | 455/63.4 |
| 2008/0075033 | A1* | 3/2008 | Shattil | 370/328 |

FOREIGN PATENT DOCUMENTS

| | | |
|---|---|---|
| JP | 229584 | 9/1989 |
| KR | 2002-049358 | 6/2002 |
| KR | 2004-27210 | 4/2004 |
| KR | 2004-102446 | 12/2004 |
| WO | WO-0119075 | 3/2001 |

* cited by examiner

*Primary Examiner*—Don N Vo
(74) *Attorney, Agent, or Firm*—Rabin & Berdo, P.C.

(57) ABSTRACT

There are provided a method for selecting an optimal beam to improve digital broadcasting receiving performance, and a digital broadcasting receiving apparatus using the same. The method includes the steps of: a) calculating a mainpath Signal to Multipath signal and Noise Ratio (SMNR) based on a channel impulse response for a plurality of beams which are formed according to steering directions from output signals of antennas, wherein the output signal of each antenna has different phase shift according to location of antenna element; b) selecting a predetermined number of beams having a high SMNR value by comparing the calculated SMNR value for respective beam; c) calculating a mainpath Signal to Dominant Multipath signal Ratio (SDMR) based on a channel impulse response corresponding to the selected beam; and d) selecting a beam output signal having the biggest SDMR value by comparing SDMR values calculated in selecting a predetermined number of beams.

7 Claims, 4 Drawing Sheets

[Fig. 1]
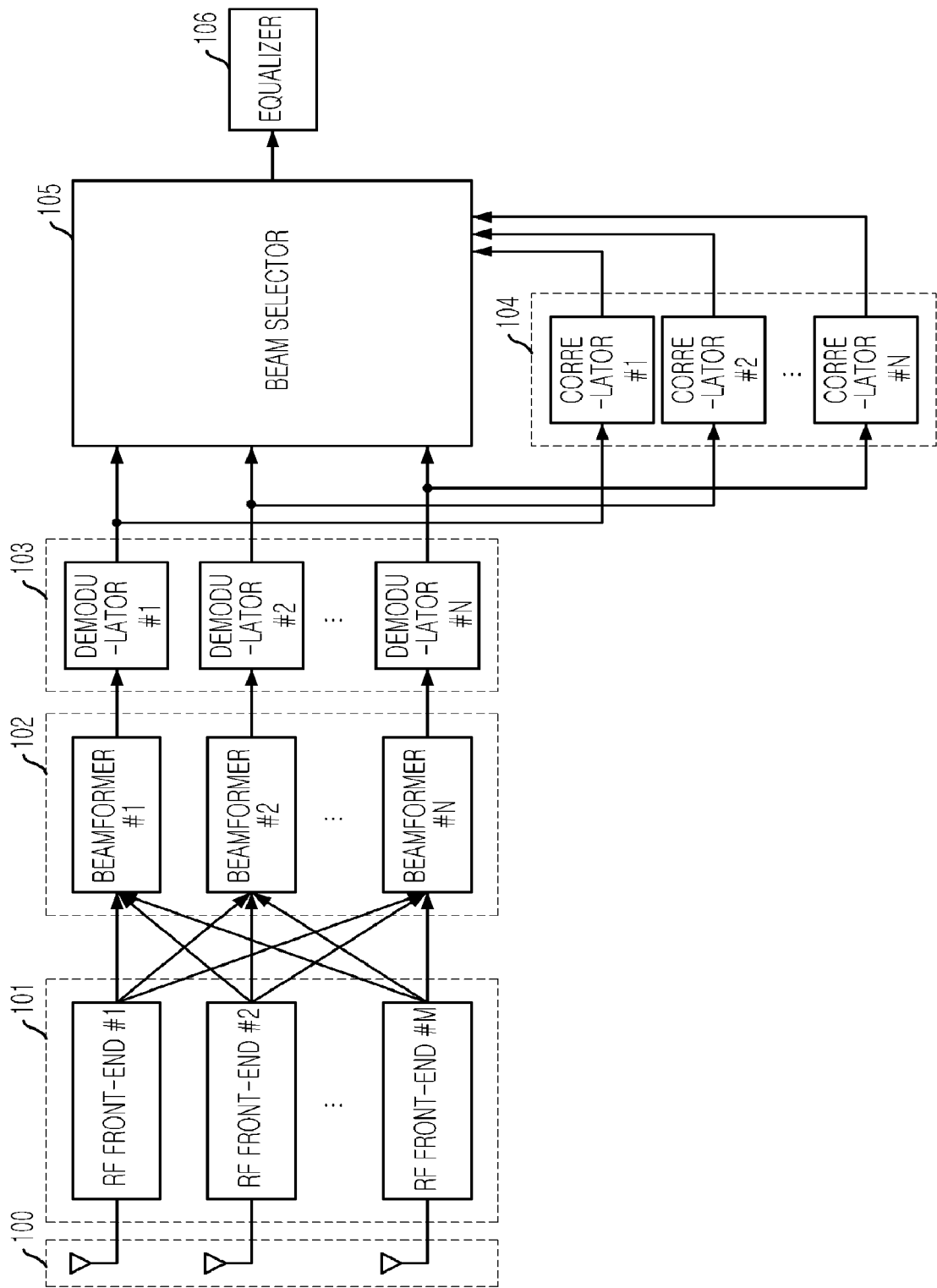

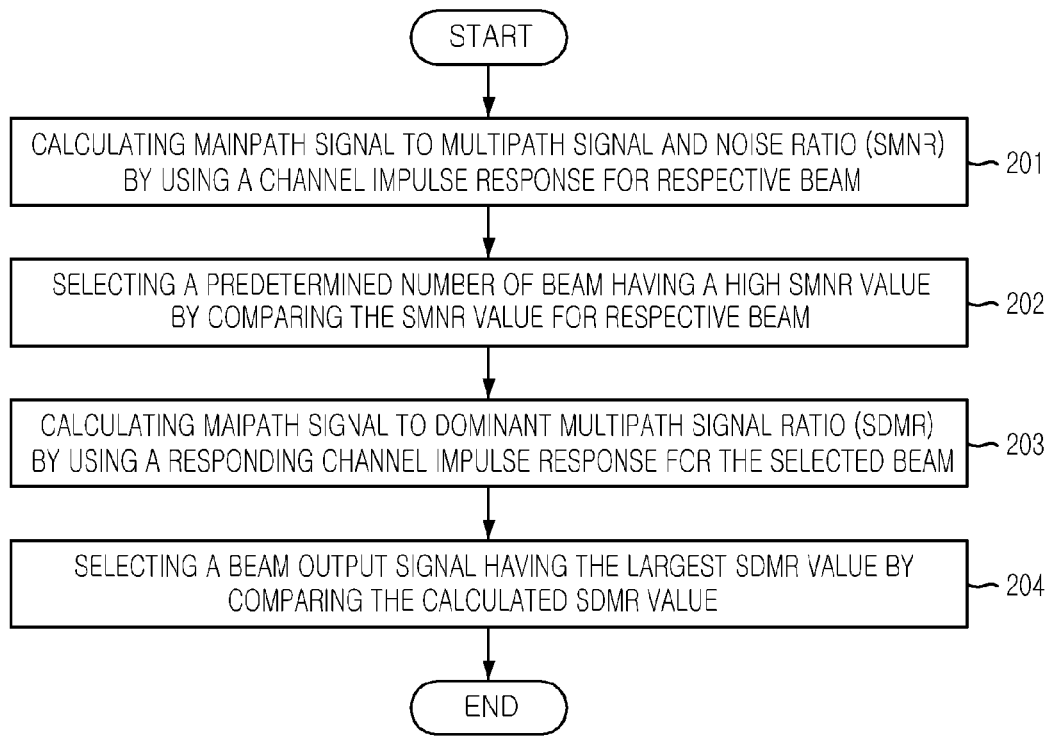
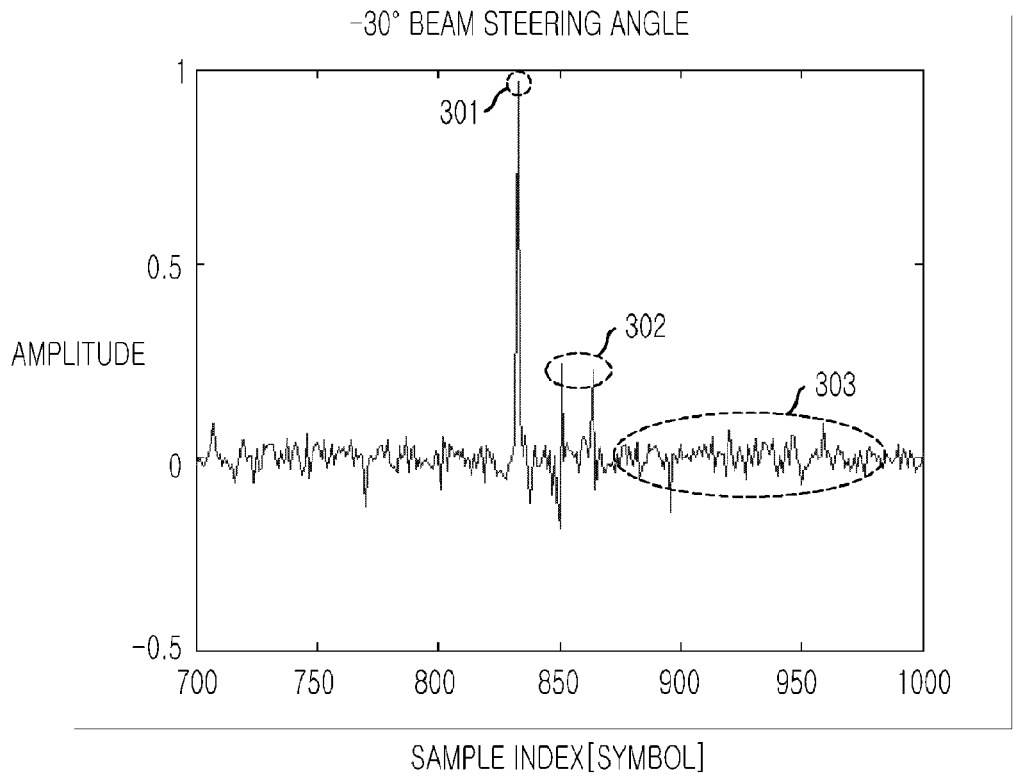

[Fig. 4]
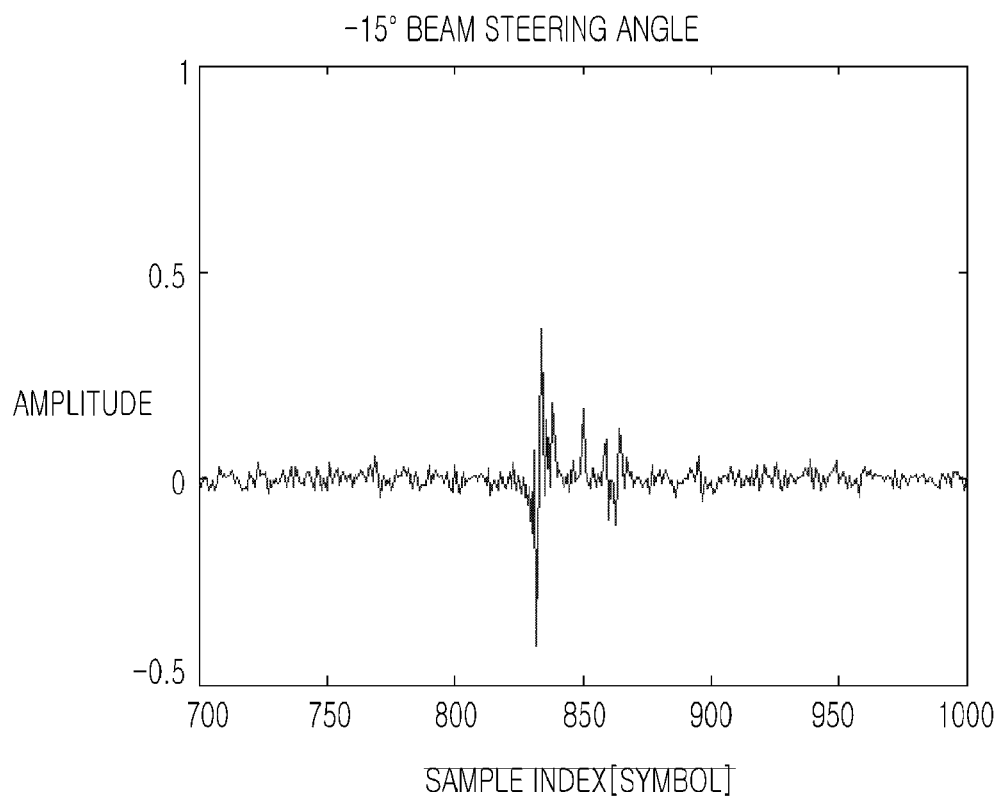
[Fig. 5]
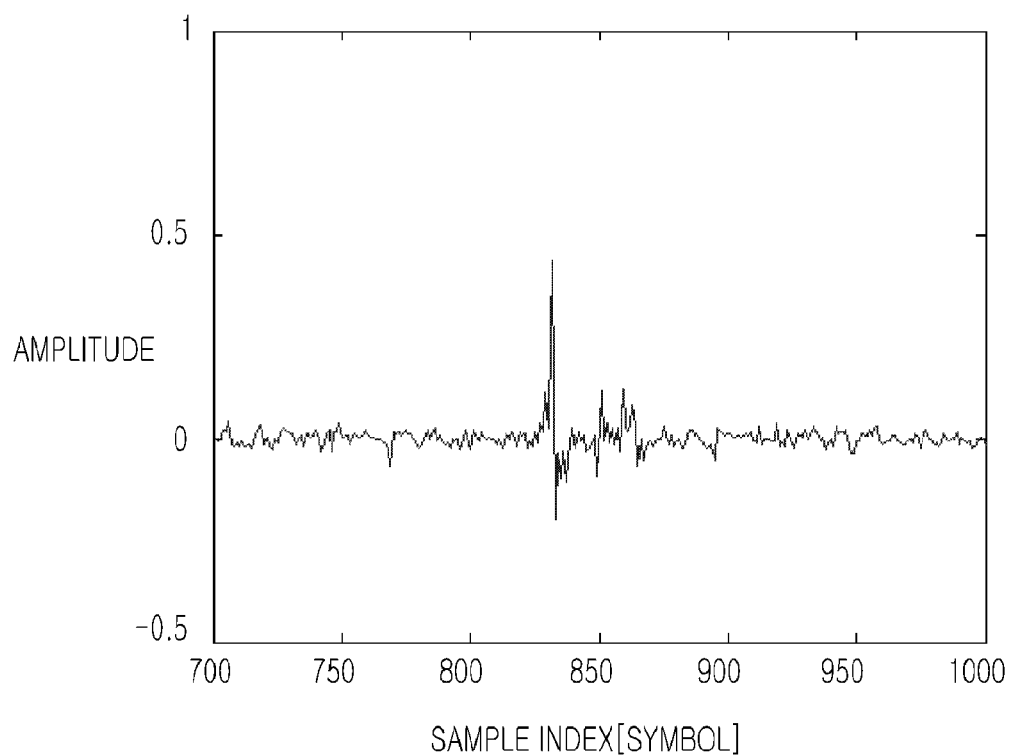

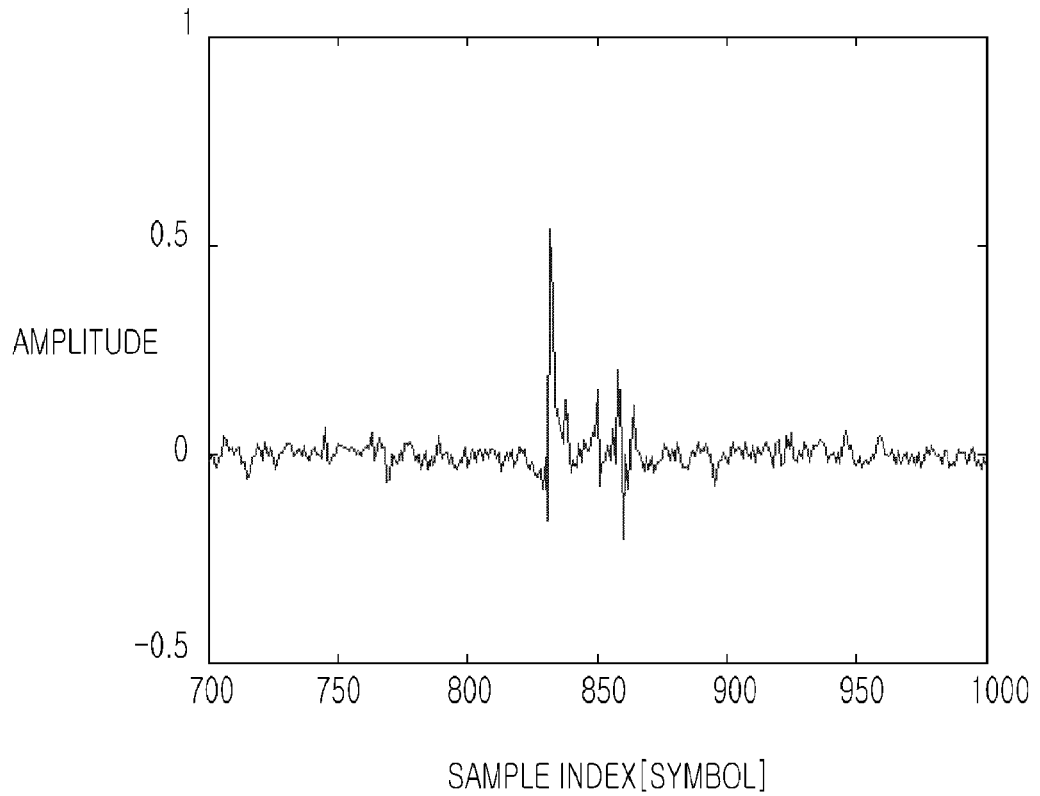
[Fig. 6]
15° BEAM STEERING ANGLE
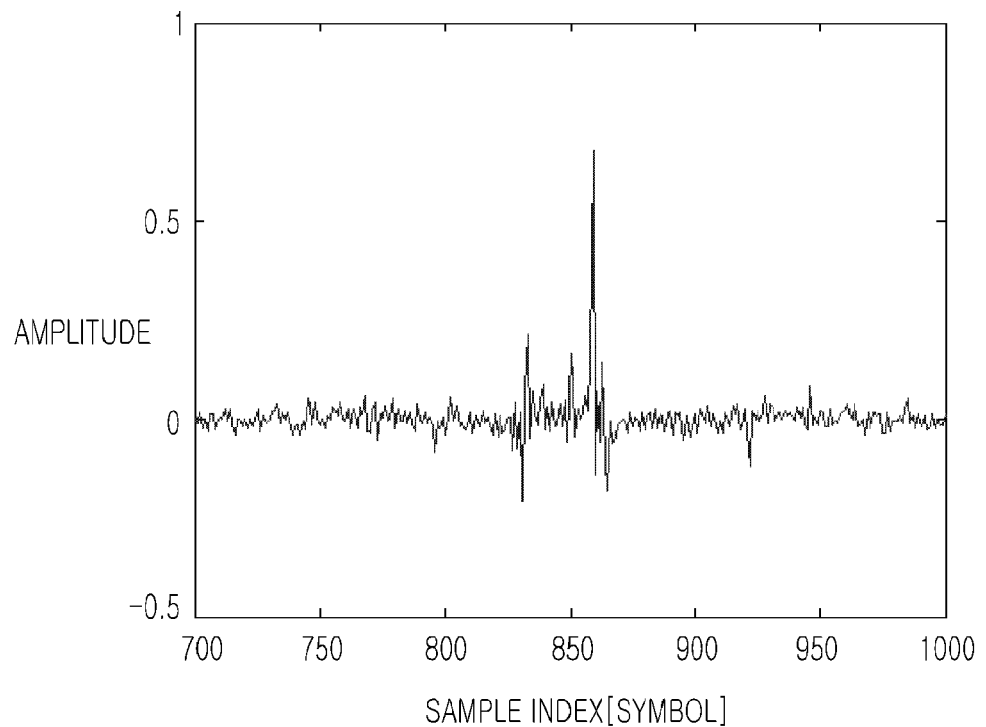
[Fig. 7]
30° BEAM STEERING ANGLE

METHOD FOR SELECTING OPTIMAL BEAM AND APPARATUS FOR RECEIVING DIGITAL BROADCASTING SIGNAL USING THE SAME

TECHNICAL FIELD

The present invention relates to a digital broadcasting receiving apparatus using an optimal beam selection; and, more particularly, to an optimal beam selection method that can improve digital broadcasting receiving performance, and digital broadcasting receiving apparatus using the same by selecting a beam output signal having the least channel distortion, among a plurality of beam output signals outputted from a digital broadcasting receiving apparatus.

BACKGROUND ART

A digital Television (DTV) transmission system adopting an Advanced Television Systems Committee (ATSC) scheme transmits high quality image to users at a high data rate. However, receiving performance depends on a Doppler transition effect or a multipath signal. Accordingly, the receiving performance is deteriorated since an equalizer of the DTV does not compensate perfectly for the distortion of a channel in a poor channel environment such as an indoor receiving environment or a mobile receiving environment.

A method for reducing the channel distortion to be compensated in the equalizer is proposed, and the method for reducing the channel distortion performs a signal process in a spatial domain as well as in a time domain.

Conventional beam forming technologies are classified into an adapted beam forming method and a switched beam selection method.

The adapted beam forming method calculates weight coefficients for beam forming adaptively and in real time.

The switched beam selection method forms a plurality of beams by using weight coefficients fixed to predetermined directions, and selects and uses a signal having the best receiving performance among a plurality of beams.

Thus, the switched beam selection method is embodied more simply than the adapted beam forming method and is easily applicable to a DTV system.

That is, the switched beam selection method comes into the spotlight, since the method improves the receiving performance through relatively simple method in a receiver of the DTV.

Since a received signal via the switched beam selection system is inputted to the receiver of the DTV after most multipath signals are removed, an equalizer of the receiver of the DTV can compensate for remaining distortion of the received signal easily.

In more details, the beam selection method in the conventional switched beam selection technology calculates a channel impulse response based on each beam output, and then selects a beam having the least number of multipath signals. The multipath signals each has a value higher than a predetermined threshold value.

DISCLOSURE OF INVENTION

Technical Problem

However, a threshold value, which is a standard of beam selection, can become a relative comparison value of a mainpath signal to multipath signals, and can be determined diversely according to an application condition, so it is not easy to determine the threshold value.

That is, since a threshold value is varied according to a channel condition or a structure of an equalizer, it is quite difficult to calculate the threshold value appropriately.

In short, it is quite difficult to determine a threshold value for a channel impulse response, which is changeable according to a directivity of each beam, and it is hard to select an optimal beam even if the threshold value is determined.

Technical Solution

In accordance with an aspect of the present invention, there is provided an optimal beam selection method for improving digital broadcasting receiving performance, the method comprising the steps of: a) calculating a mainpath Signal to Multipath signal and Noise Ratio (SMNR) based on a channel impulse response for a plurality of beams which are formed according to steering directions from output signals of antennas, wherein the output signal of each antenna has different phase shift according to location of antenna element; b) selecting a predetermined number of beams having a high SMNR value by comparing the calculated SMNR value for respective beam; c) calculating a mainpath Signal to Dominant Multipath signal Ratio (SDMR) based on a channel impulse response corresponding to the selected beam; and d) selecting a beam output signal having the biggest SDMR value by comparing SDMR values calculated in selecting a predetermined number of beams.

In accordance with an aspect of the present invention, there is provided a digital broadcasting receiving apparatus using an optimal beam selection method, including: a plurality of Radio Frequency (RF) front-end unit for changing a RF signal received from respective element of an array antenna into a digital signal of an Intermediate Frequency (IF) band; a plurality of beam forming unit for forming a plurality of beams according to steering directions based on the IF signal outputted from the RF front-end unit; a plurality of demodulating unit for demodulating the beam output signal formed in the beam forming unit to baseband signal on a symbol-by-symbol basis; a plurality of correlating unit for generating a channel impulse response by correlating the output signal of the demodulating unit with a training signal; a plurality of beam selecting unit for selecting a signal having the least channel distortion among the output signals outputted from the demodulating unit based on a mainpath Signal to Multipath signal and Noise Ratio (SMNR) and a mainpath Signal to Dominant Multipath signal Ratio (SDMR) for respective channel impulse response generated in the correlating unit; and an equalizing unit for compensating a channel distortion in the output signal of the beam selecting unit.

Advantageous Effects

It is, therefore, an object of the present invention to provide an optimal beam selection method that improves digital broadcasting receiving performance, and a digital broadcasting receiving apparatus using the same by selecting a beam output signal having the least distortion among a plurality of beam output signals formed in a digital broadcasting receiving apparatus.

BRIEF DESCRIPTION OF THE DRAWINGS

The above and other objects and features of the present invention will become apparent from the following description of the preferred embodiments given in conjunction with the accompanying drawings, in which:

FIG. 1 is a block diagram showing a digital broadcasting receiving apparatus using an optimal beam selection method in accordance with an embodiment of the present invention;

FIG. 2 is a flow chart describing an optimal beam selection method for improving digital broadcasting receiving performance in accordance with an embodiment of the present invention;

FIG. 3 is a diagram showing a channel impulse response of a beam output when a steering angle of a beam is −30°

FIG. 4 is a diagram showing a channel impulse response of a beam output when a steering angle of a beam is −15°

FIG. 5 is a diagram showing a channel impulse response of a beam output when a steering angle of a beam is 0°

FIG. 6 is a diagram showing a channel impulse response of a beam output when a steering angle of a beam is 15° and FIG. 7 is a diagram showing a channel impulse response of a beam output when a steering angle of a beam is 30°

BEST MODE FOR CARRYING OUT THE INVENTION

Other objects and aspects of the invention will become apparent from the following description of the embodiments with reference to the accompanying drawings, which is set forth hereinafter.

FIG. 1 is a block diagram showing a digital broadcasting receiving apparatus using an optimal beam selection method in accordance with an embodiment of the present invention.

When the number of array antennas 100 and a direction of each beam is determined, weight coefficients according to the direction are determined. In FIG. 1, "M" denotes the number of array antennas and "N" denotes the number of determined beams.

An incident signal received in an element of each antenna has a different phase shift in accordance with an array location of the antenna. Each received signal is changed into a digital signal of an Intermediate Frequency (IF) band through a Radio Frequency (RF) front-end unit 101.

N beamformers 102 receive the output signals of M RF front-end units 101, and form N beams which have different steering directions. A demodulator 103 demodulates an output signal of each beamformer 102 into a baseband signal on a symbol-by-symbol basis.

An output signal of each demodulator 103 is inputted to a correlator 104 for estimating a channel impulse response of the received signal. The correlator 104 obtains the channel impulse response by using a cross correlation of a PN511 signal of field segment and the output signal of the demodulator 103. The PN511 signal of a field segment is a kind of a training signal.

The channel impulse response obtained from the correlator 104 is shown in FIGS. 3 to 7, and shows the results when each beam is formed by 15° interval between −30° to 30° in a predetermined channel.

If the output signals of N correlators 104 are inputted to a beam selector 105, an output signal of the demodulator of an nth beam, which is selected by a beam selector 105 by using a beam selection algorithm, is an input signal of an equalizer 106.

Then, the equalizer 106 performs a process compensating for remaining channel distortion in the output signal of the beam selector 105.

FIG. 2 is a flow chart describing an optimal beam selection method for improving digital broadcasting receiving performance in accordance with an embodiment of the present invention, and shows an algorithm for selecting a reliable beam that improves receiving performance in several beams. The beam selector 105 performs the optimal beam selection method.

That is, an embodiment of the present invention relates to a beam selection algorithm for inputting the least distorted signal out of a plurality of beams to the equalizer of the DTV receiving apparatus.

An embodiment of the present invention relates to selecting an optimal beam by using a condition of mainpath Signal to Multipath signal and Noise Ratio (SMNR) and main path Signal to Dominant Multipath signal Ratio (SDMR) in a channel impulse response. A detailed process is described hereinafter.

The beam selector 105 calculates SMNR with respect to respective beam by using a channel impulse response estimated in the correlator 104 at step S201. In detail, a signal 301 having the biggest amplitude in channel impulse responses shown in FIGS. 3 to 7 is a mainpath signal, and the other signals 302 and 303 are multipath signal and noise ratio in SMNR.

Firstly, at step S202, a predetermined number of, e.g., 2 to 3 beams having a high SMNR value are selected by using the SMNR calculated in the step S201.

The number of beams selected in the first selection depends on the number of beams adapted to a DTV receiving apparatus. The selected beams have a possibility improving performance of a DTV receiving apparatus.

The SDMR for the beams firstly selected by the above process is calculated by using channel impulse responses corresponding to the selected beams at step S203. That is, the SDMR is calculated in accordance with mainpath signal to multipath signal ratio, which has the largest amplitude. The above process verifies amplitude distribution of multipath signal.

When the SMNR values of the firstly selected beams are similar, in order to improve the receiving performance, it is preferred to select a beam output signal having a plurality of small multipath signals rather than to select a beam output signal having one big multipath signal in the equalizer 102.

That is, at step S204, the biggest beam output signal of demodulator is selected by comparing the SDMR values in channel impulse response of a beam, which is firstly selected.

FIGS. 3 to 7 show channel impulse responses of beam output signals according to a steering angle of a beam.

FIG. 3 is a diagram showing a channel impulse response of a beam output signal(first beam output) when a steering angle of a beam is −30° and FIG. 4 is a diagram showing a channel impulse response of a beam output (second beam output) signal when a steering angle of a beam is −15°

FIG. 5 is a diagram showing a channel impulse response of a beam output signal (third beam output) when a steering angle of a beam is 0° and FIG. 6 is a diagram showing a channel impulse response of a beam output signal (fourth beam output) when a steering angle of a beam is 15° and FIG. 7 is a diagram showing a channel impulse response of a beam output signal (fifth beam output) when a steering angle of a beam is 30°

If a beam having the threshold value of 0.5 is selected in a case of a conventional art, a multipath signal over the threshold value does not exist in channel impulse responses as shown in FIGS. 3 to 7.

However, the channel impulse responses as shown in FIGS. 3 and 7 are firstly selected, and the channel impulse response as shown in FIG. 3 is finally selected according to a second selection condition in a case of an embodiment of the present invention.

Accordingly, it is quite difficult to define a predetermined threshold value for many changeable channel impulse responses according to the steering angle, and it is quite difficult to select an optimal beam even if the threshold value is defined according to the conventional art.

A reliable optimal beam improving performance of a DTV receiving apparatus in mobile or indoor receiving environment is selected in accordance with an embodiment of the present invention In addition, an embodiment of the present invention has optimal receiving performance by selecting a beam according to the SMNR and SDMR condition without a predetermined limitation or numerical value.

A beam selection DTV receiver improves performance of the DTV receiver by reducing amplitude of multipath signals through a directivity of a beam in a channel of deteriorated DTV receiving environment.

As above-mentioned, the method of the present invention can be embodied as a program and stored in computer-readable recording media readable by a computer, e.g., CD-ROM, RAM, floppy disk, hard disk, magneto-optical disk, etc.

The present application contains subject matter related to Korean patent application No. 2004-0098223, filed with the Korean Patent Office on Nov. 26, 2004, the entire contents of which being incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. A method for selecting an optimal beam to improve digital broadcasting receiving performance, the method comprising the steps of:
   a) calculating a mainpath Signal to Multipath signal and Noise Ratio (SMNR) based on a channel impulse response for a plurality of beams which are formed according to steering directions from output signals of antennas, wherein the output signal of each antenna has different phase shift according to location of antenna element;
   b) selecting a predetermined number of beams having a high SMNR value by comparing the calculated SMNR value for respective beam;
   c) calculating a mainpath Signal to Dominant Multipath signal Ratio (SDMR) based on a channel impulse response corresponding to the selected beam; and
   d) selecting a beam output signal having the biggest SDMR value by comparing SDMR values calculated in selecting a predetermined number of beams.

2. The method as recited in claim 1, wherein in the step a), a signal having the biggest amplitude in respective channel impulse response is determined as a mainpath signal, and the other signals are determined as multipath signals and noise ratio in SMNR.

3. The method as recited in claim 1, wherein the predetermined number of beams is determined based on the number of beams adapted to the digital broadcasting receiving apparatus.

4. An apparatus for receiving a digital broadcasting signal based on an optimal beam selection method, comprising:
   a plurality of Radio Frequency (RF) front-end means for changing a RF signal received from respective element of an array antenna into a digital signal of an Intermediate Frequency (IF) band;
   a plurality of beam forming means for forming a plurality of beams according to steering directions based on the IF signal outputted from the RF front-end means;
   a plurality of demodulating means for demodulating the beam output signal formed in the beam forming means to baseband signal on a symbol-by-symbol basis;
   a plurality of correlating means for generating a channel impulse response by correlating the output signal of the demodulating means with a training signal;
   a plurality of beam selecting means for selecting a signal having the least channel distortion among the output signals outputted from the demodulating means based on a mainpath Signal to Multipath signal and Noise Ratio (SMNR) and a mainpath Signal to Dominant Multipath signal Ratio (SDMR) for respective channel impulse response generated in the correlating means; and
   an equalizing means for compensating a channel distortion in the output signal of the beam selecting means.

5. The apparatus as recited in claim 4, the beam selecting means includes:
   a first calculating means for calculating a mainpath Signal to Multipath signal and Noise Ratio (SMNR) based on a channel impulse response for a plurality of beams which are formed according to steering directions from output signals of antennas, wherein the output signal of each antenna has different phase shift according to location of antenna element;
   a first selecting means for selecting a predetermined number of beams having a high SMNR value by comparing the calculated SMNR value for respective beam;
   a second calculating means for calculating a mainpath Signal to Dominant Multipath signal Ratio (SDMR) based on a channel impulse response corresponding to the selected beam; and
   a second selecting means for selecting a beam output signal having the largest SDMR value by comparing SDMR values calculated in selecting a predetermined number of beams.

6. The apparatus as recited in claim 5, wherein a signal having the largest amplitude in respective channel impulse response is determined as a mainpath signal, and the other signals are determined as multipath signals and noise ratio in SMNR.

7. The apparatus as recited in claim 5, wherein the predetermined number of beam is determined based on the number of beams adapted to the digital broadcasting receiving apparatus.

* * * * *